(12) United States Patent
Chen (10) Patent No.: US 12,375,564 B2
(45) Date of Patent: Jul. 29, 2025

(54) COMMUNICATION METHOD, VEHICLE-TO-EVERYTHING PLATFORM, ON-BOARD UNIT AND STORAGE MEDIUM

(71) Applicant: ZTE CORPORATION, Shenzhen (CN)

(72) Inventor: Rui Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 189 days.

(21) Appl. No.: 18/273,769

(22) PCT Filed: Feb. 14, 2022

(86) PCT No.: PCT/CN2022/076209
§ 371 (c)(1),
(2) Date: Jul. 23, 2023

(87) PCT Pub. No.: WO2022/213723
PCT Pub. Date: Oct. 13, 2022

(65) Prior Publication Data
US 2024/0073281 A1 Feb. 29, 2024

(30) Foreign Application Priority Data
Apr. 7, 2021 (CN) .......................... 202110372317.8

(51) Int. Cl.
*H04L 67/12* (2022.01)
*H04W 4/48* (2018.01)
*H04W 76/14* (2018.01)

(52) U.S. Cl.
CPC ............... *H04L 67/12* (2013.01); *H04W 4/48* (2018.02); *H04W 76/14* (2018.02)

(58) Field of Classification Search
None
See application file for complete search history.

(56) References Cited

U.S. PATENT DOCUMENTS

2016/0309423 A1* 10/2016 Lee .................... H04B 7/26
2019/0028862 A1* 1/2019 Futaki .................. H04W 4/44

FOREIGN PATENT DOCUMENTS

| CN | 109801494 A | 5/2019 |
| CN | 111526496 A | 8/2020 |

(Continued)

OTHER PUBLICATIONS (ISA/237) Written Opinion of the International Searching Authority dated Apr. 14, 2022.

(Continued)

*Primary Examiner* — Frantz Bataille
(74) *Attorney, Agent, or Firm* — NZ Carr Law Office (57) ABSTRACT

The embodiments of the present application relate to the technical field of vehicle-to-everything. Disclosed are a communication method, a vehicle-to-everything platform, an on-board unit and a storage medium. In the present application, the communication method is applied to a vehicle-to-everything platform, and the method comprises: determining an operating state of a road side unit (RSU) by means of a long-distance communication interface which faces the RSU; when it is detected that the operating state of the RSU is abnormal, determining a target on-board unit (OBU) according to a position of the RSU and a position of the OBU reported by the long-distance communication interface which faces the OBU, wherein the OBU establishes a communication connection with the RSU by means of a short-distance communication interface; and issuing vehicle-to-everything (V2X) information to the target OBU by means of the long-distance communication interface which faces the target OBU.

20 Claims, 4 Drawing Sheets

(56) References Cited

FOREIGN PATENT DOCUMENTS

| | | |
|---|---|---|
| CN | 112533174 A | 3/2021 |
| WO | 2017041516 A1 | 3/2017 |

OTHER PUBLICATIONS

International search report of the corresponding PCT Application No. PCT/CN2022/076209 mailed on Apr. 14, 2022 along with English translation thereof.

* cited by examiner

COMMUNICATION METHOD, VEHICLE-TO-EVERYTHING PLATFORM, ON-BOARD UNIT AND STORAGE MEDIUM

CROSS REFERENCE TO RELATED APPLICATIONS

The present application is put forward based on Chinese Patent Application No. "202110372317.8", filed on Apr. 7, 2021, and claims priority of this Chinese Patent Application, the entire contents of which are hereby incorporated by reference herein.

TECHNICAL FIELD

Embodiments of the present application relate to the technical field of vehicle-to-everything, in particular to a communication method, a vehicle-to-everything platform, an on-board unit and a storage medium.

BACKGROUND

A cellular vehicle-to-everything (C-V2X) communication technology is an emerging vehicle-to-everything (V2X) communication technology based on a cellular communication technology. V2X refers to a wireless communication technology between vehicles, or between a vehicle and a pedestrian, a rider or a road side infrastructure, i.e., information exchange between the vehicle and the outside. V2X organically links traffic participation factors such as "people, vehicles, roads, and clouds", and can not only support a vehicle to obtain more information than a bicycle and promote the innovation and application of an autonomous driving technology, but also be beneficial to the construction of a smart traffic system and the promotion of the development of new patterns and new types of automobile and traffic service so as to be of great significance to improve the traffic efficiency, save resources, reduce pollution and accident rates, and improve traffic management. C-V2X is one of the main V2X technical routes. Compared with traditional V2X, C-V2X has the advantages such as wide coverage range, support for high-density on-board networks, smooth signal flow, and capability of providing stable broadcast service so as to be capable of facing up to open challenges of on-board communication service in a high-mobility and dense environment.

C-V2X vehicle-road cooperation is still in a market cultivation stage, there are great limitations on the layout of a road side unit (RSU) used to transmit V2X information to an on-board unit (OBU) in a nearby passing vehicle, and therefore, when the RSU near a vehicle running road section where the OBU is located cannot operate normally, such as power failure, shutdown, and abnormality, or there is no RSU nearby, the OBU cannot acquire V2X information accurately and timely, which results in poor C-V2X service quality.

SUMMARY

An embodiment of the present application provides a communication method, applied to a vehicle-to-everything platform, including: determining an operating state of a road side unit (RSU) by means of a long-distance communication interface which faces the RSU; when it is detected that the operating state of the RSU is abnormal, determining a target on-board unit (OBU) according to a position of the RSU and a position of the OBU reported by the long-distance communication interface which faces the OBU, the OBU establishing a communication connection with the RSU by means of a short-distance communication interface; and issuing vehicle-to-everything (V2X) information to the target OBU by means of the long-distance communication interface which faces the target OBU.

An embodiment of the present application further provides a communication method, applied to an OBU mounted in a vehicle, including: determining an operating state of a road side unit RSU by means of a short-distance communication interface which faces the RSU; when it is detected that the operating state of the RSU is normal, mutually transmitting V2X information to the RSU by means of the short-distance communication interface which faces the RSU, and reporting vehicle information to a vehicle-to-everything platform by means of a long-distance communication interface which faces the vehicle-to-everything platform, the vehicle information including a position of the vehicle, so that the vehicle-to-everything platform issues the V2X information to the OBU according to the position of the vehicle and a pre-recorded position of the RSU when the operating state of the RSU is abnormal; and when it is detected that the operating state of the RSU is abnormal, mutually transmitting the V2X information to the vehicle-to-everything platform by means of the long-distance communication interface which faces the vehicle-to-everything platform.

An embodiment of the present application further provides a vehicle-to-everything platform, including: a memory in communication connection with at least one processor; wherein, the memory stores an instruction executable by the at least one processor, and the instruction is executed by the at least one processor so that the at least one processor is capable of performing the above-mentioned communication method applied to the vehicle-to-everything platform.

An embodiment of the present application further provides an on-board unit, including: a memory in communication connection with at least one processor, wherein the memory stores an instruction executable by the at least one processor, and the instruction is executed by the at least one processor so that the at least one processor is capable of performing the above-mentioned communication method applied to an OBU mounted in a vehicle.

An embodiment of the present application further provides a computer-readable storage medium, storing a computer program. When being executed by a processor, the computer program implements the above-mentioned communication method applied to the vehicle-to-everything platform or the above-mentioned communication method applied to the OBU mounted in the vehicle.

BRIEF DESCRIPTION OF THE DRAWINGS

One or more embodiments are exemplarily described by means of figures in accompanying drawings corresponding thereto, and these exemplary descriptions do not constitute limitations on the embodiments.

DETAILED DESCRIPTION

In order to make objectives, technical solutions and advantages of embodiments of the present application clearer, each embodiment of the present application will be described in detail below in conjunction with the accompanying drawings. However, it can be understood by those of ordinary skill in the art that, in each embodiment of the present application, a plurality of technical details have been put forward in order to ensure that a reader better understands the present application. However, the technical solutions required to be protected in the present application can be achieved even if there are no technical details or various changes and modifications based on the following embodiments. The following division of all the embodiments is for the purpose of facilitating description, and should not constitute any limitations on specific implementations of the present application. All the embodiments can be combined or referred with each other without contradiction.

Objectives of embodiments of the present application are to provide a communication method, a vehicle-to-everything platform, an on-board unit and a storage medium to at least solve the technical problem that high-quality C-V2X service cannot be provided because the OBU cannot acquire V2X information accurately and timely when a RSU cannot normally operate.

According to the communication method, the vehicle-to-everything platform, the on-board unit and the storage medium provided in embodiments of the present application, the vehicle-to-everything platform and the OBU bidirectionally detect an operating state of the RSU, and thus, when the operating state of the RSU is in an abnormal state, that is, it is impossible to issue the V2X information to the OBU by means of a PC5 interface and it is also impossible to report the V2X information provided by the OBU to the vehicle-to-everything platform by means of a Uu interface, a target OBU required to transceive the V2X information near the abnormal RSU is directly determined by the vehicle-to-everything platform according to a position of the abnormal RSU and a position reported by the OBU which has been connected to the vehicle-to-everything platform, and then, V2X interaction with the target OBU is directly performed based on the Uu interface, so that the V2X information can be acquired even if the operating state of the RSU is in an abnormal state or a vehicle is located on a road section where no RSUs are disposed, the robustness of C-V2X is effectively perfected, and then, the requirement for vehicle-road cooperation can be better satisfied.

Besides, according to the communication method, the vehicle-to-everything platform, the on-board unit and the storage medium provided in embodiments of the present application, C-V2X service can also be applied on the road section where no RSUs are disposed, so that vehicle-road cooperation based on C-V2X can also be perfectly used in an environment where an infrastructure such as the RSU is weak, and then, the commercial application of the vehicle-road cooperation is greatly accelerated.

Figure 1:
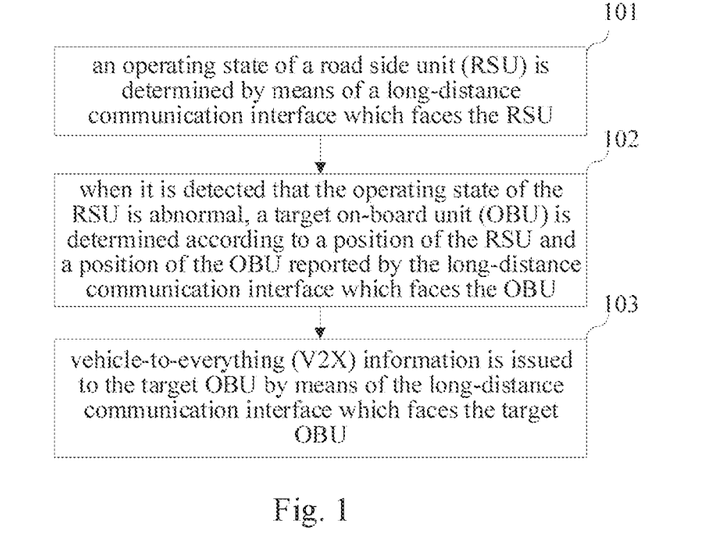
FIG. 1 is a schematic flow diagram of a communication method provided in a first embodiment of the present application.

A first embodiment of the present application relates to a communication method applied to a vehicle-to-everything platform, a flow thereof is shown in FIG. 1. The communication method includes, but is not limited the following steps.

At operation 101, an operating state of a road side unit (RSU) is determined by means of a long-distance communication interface which faces the RSU.

At operation 102, when it is detected that the operating state of the RSU is abnormal, a target on-board unit (OBU) is determined according to a position of the RSU and a position of the OBU reported by the long-distance communication interface which faces the OBU. It should be noted that the OBU on the position of the OBU reported by means of the long-distance communication interface which faces the OBU specifically refers to an OBU establishing a communication connection with the RSU by means of a short-distance communication interface.

At operation 103, vehicle-to-everything (V2X) information is issued to the target OBU by means of the long-distance communication interface which faces the target OBU.

According to the communication method provided in the embodiment of the present application, the vehicle-to-everything platform actively monitors the operating state of the RSU providing the V2X information with a high real-time performance. If the operating state of the RSU is in a normal state, the RSU provides the V2X information for the OBU, and thus, the rapidness, accuracy and efficiency of the V2X service are guaranteed. If the monitored operating state of the RSU is in an abnormal state, the target OBU required to transceive the V2X information near the abnormal RSU is directly determined according the position of the abnormal RSU and the position reported by the OBU which has been connected to the vehicle-to-everything platform, and then, the V2X information is actively issued, based on a C-V2X communication way, to the target OBU by means of the Uu interface, so that the target OBU may also acquire the V2X information even if the operating state of the RSU is in an abnormal state. In such a way, the robustness of C-V2X is effectively perfected, and then, the requirement for vehicle-road cooperation can be better satisfied.

A second embodiment of the present application relates to a communication method applied to a vehicle-to-everything platform.

Specifically speaking, the current vehicle-road cooperation solution based on the C-V2X communication way either directly stipulates that the on-board unit (OBU) can only acquire the V2X information from the road side unit (RSU), or it directly breaks away from the RSU and stipulates that the OBU can only acquire the V2X information from the vehicle-to-everything platform.

For the way in which it is stipulated that, during actual applications, the V2X information can be only acquired from the RSU, enough RSUs are required to be disposed on a road surface to cover a road, which puts forward a higher requirement for an infrastructure. However, the current number of the disposed RSUs is very limited, and therefore, the road is covered finitely. For the way in which the RSU is not used and it is stipulated that the V2X information can be only acquired from the vehicle-to-everything platform, although the problem that it is impossible to cover roads as many as possible due to the limited number of the RSUs can be solved, when the OBU directly gets rid of the RSU to acquire the V2X information from the vehicle-to-everything platform, there will be a non-negligible problem that the V2X information cannot be issued to the OBU timely, and therefore, the OBU will not provide on-board service for a vehicle accurately and timely.

Based on this, the present embodiment provides a communication method capable of giving consideration to the real-time performance of the C-V2X service and applicable to a limited number of RSUs, thereby ensuring that the OBU can still normally acquire the V2X information while the operating state of the RSU is in an abnormal state.

Implementation details of the communication method in the present embodiment will be described below, and the following content are only implementation details provided for facilitating understanding, but are not essentials for implementing the present solution.

Figure 2:
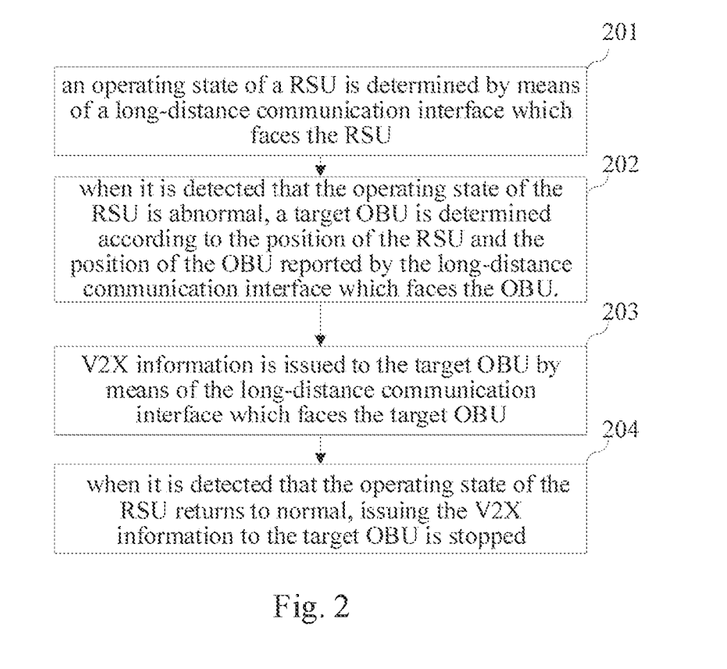
FIG. 2 is a schematic flow diagram of a communication method provided in a second embodiment of the present application.

The communication method provided in the present embodiment is shown in FIG. 2. The communication method includes, but is not limited to the following operations.

At operation 201, an operating state of a RSU is determined by means of a long-distance communication interface which faces the RSU.

Specifically speaking, the communication method mentioned in the present embodiment is mainly for a C-V2X technology, that is, when the operating state of the RSU is determined, specifically, the operating state of the RSU is determined based on a C-V2X communication way by means of the long-distance communication interface which faces the RSU.

It should be understood that the current C-V2X communication way provides two communication interfaces, with one being a short-distance communication interface among a vehicle, a person and a road, i.e., a PC5 interface; and the other one being a vehicle which is substantially an OBU and a vehicle-to-everything platform on the vehicle, which can also be referred to as a long-distance communication interface between base stations, i.e., a Uu interface.

For the PC5 interface, it directly communicates with an infrastructure, such as the RSU, on a road, and therefore, mutually transmitted V2X information is high in transmission speed and good in real-time performance. For the Uu interface, the V2X information is mutually transmitted to a remote vehicle-to-everything platform by means of a cellular network, and therefore, a wide coverage range and stable transmission are achieved, but there is a certain time delay.

Figure 3:
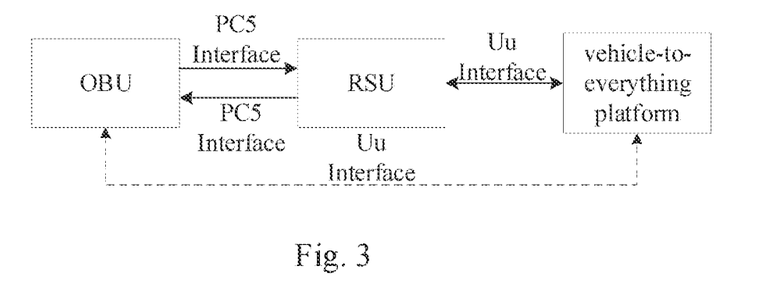
FIG. 3 is a schematic diagram of communication among an OBU, a RSU and a vehicle-to-everything platform involved in the communication method provided in the second embodiment of the present application.

Based on the two communication interfaces supported by C-V2X, in order to solve the technical problem that high-quality C-V2X service cannot be provided because the OBU cannot acquire the V2X information when the RSU cannot operate normally, the OBU, the RSU and the vehicle-to-everything platform involved in the communication method provided in the present embodiment pre-establish a communication link shown in FIG. 3.

As shown in FIG. 3, under a normal condition, that is, after the OBU receives data broadcast by a nearby RSU, a PC5 bidirectional communication link is established to the recognized RSU by means of the short-distance communication interface which faces to the RSU, i.e., the PC5 interface; and at the same time, a Uu bidirectional communication link is established to the vehicle-to-everything platform by means of the long-distance communication interface which faces the vehicle-to-everything platform, i.e., the Uu interface.

At the same time, each RSU disposed on the road establishes the Uu bidirectional communication link to the vehicle-to-everything platform by means of the long-distance communication interface which faces the vehicle-to-everything platform, i.e., the Uu interface.

In addition, in order to ensure that the vehicle-to-everything platform can monitor the operating state of the RSU by means of the Uu bidirectional communication link between the vehicle-to-everything platform and the RSU, heartbeat information may be mutually and regularly transmitted during actual applications, thereby ensuring that the Uu bidirectional communication link therebetween is in a connected state all the time.

Accordingly, for the PC5 bidirectional communication link between the OBU and the RSU and the Uu bidirectional communication link between the OBU and the vehicle-to-everything platform, the communication links therebetween may also be maintained to be in the connected state all the time in a way of regularly and mutually transmitting the heartbeat information.

Figure 4:
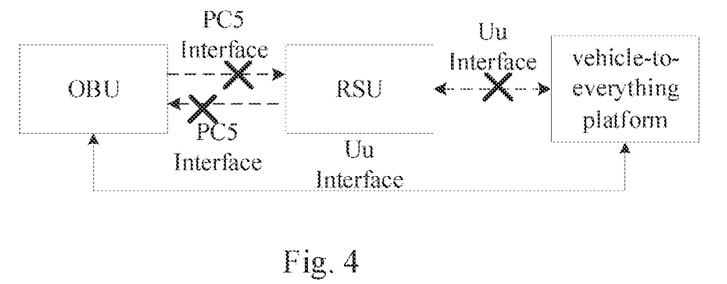
FIG. 4 is another schematic diagram of communication among the OBU, the RSU and the vehicle-to-everything platform involved in the communication method provided in the second embodiment of the present application.

Based on the communication way shown in FIG. 3, when the vehicle-to-everything platform determines, based on the C-V2X communication way, the operating state of the RSU by means of the Uu interface, specifically, it is monitored based on the C-V2X communication way by means of the Uu interface, i.e., the Uu bidirectional communication link between the vehicle-to-everything platform and the RSU, whether a basic safety message (BSM) of the OBU reported by the RSU and heartbeat information transmitted by the RSU are acquired, if neither the BMS of the OBU nor the heartbeat information sent by the RSU is acquired, or only the BSM is acquired, or only the heartbeat information is acquired, the operating state of the RSU is considered to be abnormal, that is, the Uu bidirectional communication link between the vehicle-to-everything platform and the RSU and the PC5 bidirectional communication link between the RSU and the OBU are abnormal and cannot communicate normally, as shown in FIG. 4.

The abnormal operating state of the RSU in the present embodiment specifically means that the RSU is in any one of the following states: a power-off state, a shutdown state, and an abnormal fault light state.

It should be understood that the above-mentioned example is only an example enumerated for better understanding the technical solution of the present embodiment, and is not the only limitation on the present embodiment.

At operation 202, when it is detected that the operating state of the RSU is abnormal, a target OBU is determined according to the position of the RSU and the position of the OBU reported by the long-distance communication interface which faces the OBU.

It can be understood that, during actual applications, after being put into use, a RSU disposed on a road may generally establish a communication link with the vehicle-to-everything platform by means of the Uu interface, that is, a plurality of RSUs may be connected to the vehicle-to-everything platform. Therefore, when it is recognized that the operating state of any one of connected RSUs is in an abnormal state, in order to replace the abnormal RSU to further provide C-V2X service for the OBU, i.e. the V2X information is issued, it is required to select the target OBU which satisfies the position of the OBU and the position of the RSU in the abnormal work state from a plurality of OBUs according to the position of the RSU in the abnormal work state and the position reported by all OBUs connected by means of the Uu interface.

For example, OBUs in a round area formed by taking the position of the OBU in the abnormal operating state as a center of a circle and taking a preset distance such as 500 m as a radius are all determined as target OBUs, that is, there may be a plurality of determined target OBUs.

At operation 203, V2X information is issued to the target OBU by means of the long-distance communication interface which faces the target OBU.

Specifically speaking, if a plurality of target OBUs are determined, the vehicle-to-everything platform issues the V2X information to each of the target OBUs by means of the Uu interface, for example, the V2X information is issued by means of the Uu bidirectional communication interface between the OBU and the vehicle-to-everything platform in FIG. 4.

The V2X information in the present embodiment includes, but is not limited: a signal phase timing information (SPAT), a map information MAP for describing relevant information of a road and a lane, road side information (RAI) such as road construction, speed limit signs, and overspeed warning, and a bus lane warning and road safety message (RSM) such as vehicle accidents, vehicle abnormalities, and foreign body intrusion.

In addition, during actual applications, the V2X information issued by the vehicle-to-everything platform may be further aggregated by information reported by other road infrastructures such as a camera and a signal lamp disposed around a road and OBUs in other vehicles on the current road section, information reported before the operating state of the RSU is in an abnormal state, and information reported by RSUs in normal operating states on other road sections.

In addition, during actual applications, after issuing the V2X information to the target OBU by means of the Uu interface which faces the target OBU, the vehicle-to-everything platform may further receive, by means of the Uu interface which faces the target OBU, the BSM reported by the target OBU, adjust information relevant to the BSM in the V2X information according to the BSM, and finally issue the adjusted V2X information to the target OBU by means of the long-distance communication interface which faces the target OBU.

Specifically speaking, during actual applications, the BSM generally consists of two parts, with one part including instantaneous state information of a vehicle, such as a position, speed and size, and the other part including sensor data such as sunshine levels and event records as tire leakage and car lamp conversion. Therefore, in order to ensure that the V2X information issued to the OBU by the vehicle-to-everything platform more conforms to the current state of a vehicle where the OBU is located to better provide C-V2X service for the vehicle, the V2X information required to be issued may be adjusted in real time based on the OBU by means of the BSM reported by the Uu interface in a process that the vehicle-to-everything platform mutually transmits the V2X information to the OBU based on the Uu interface, and thus, better C-V2X service can be provided.

Based on this, when the operating state of the RSU is in an abnormal state, the target OBU may also normally acquire the V2X information, and thus, the quality of the C-V2X service is ensured.

In addition, it can be understood that transceiving the V2X information to the OBU under the condition that the operating state of the RSU is in a normal state is performed by the RSU rather than the vehicle-to-everything platform, and thus, the real-time performance of the V2X information is ensured.

At operation 204, when it is detected that the operating state of the RSU returns to normal, issuing the V2X information to the target OBU is stopped.

Specifically speaking, although the vehicle-to-everything platform may provide the V2X information for the OBU, in order to ensure the real-time performance of the C-V2X service, if the vehicle-to-everything platform receives heartbeat information transmitted by the RSU in an abnormal operating state again by means of the Uu interface, and receives the BSM of the target OBU reported by the RSU, it is considered that the operating state of the RSU returns to normal, that is, both of the Uu bidirectional communication link between the RSU and the vehicle-to-everything platform and the PC5 bidirectional communication link between the RSU and the OBU return to normal, as shown in FIG. 3. At this moment, the vehicle-to-everything platform will stop issuing the V2X information to the target OBU, but the RSU of which the operating state returns to normal rapidly issues the V2X information to the target OBU in real time by means of the PC5 interface.

According to the communication method provided in the embodiment of the present application, by adopting the double links, i.e., the PC5 bidirectional communication link between the OBU and the RSU and the Uu bidirectional communication link between the OBU and the vehicle-to-everything platform, when it is recognized by the vehicle-to-everything platform that the operating state of the RSU is in an abnormal state, the V2X information is directly issued to the OBU by means of the Uu interface, so that it is ensured that the OBU may also acquire the V2X information when the operating state of the RSU is in an abnormal state or on a road section where no RSUs are disposed, and then, the C-V2X service is provided for a vehicle.

Besides, when it is recognized by the vehicle-to-everything platform that the operating state of the RSU is in a normal state or the operating state of the RSU returns to normal, issuing the V2X information to the OBU by means of the Uu interface is stopped, but the RSU issues the V2X information to the OBU by means of the PC5 interface, so that the V2X information may reach the OBU timely, and then, the real-time performance of the C-V2X service is ensured.

In addition, based on the above-mentioned double-link way, the communication method provided in the embodiment of the present application may also be perfectly suitable for places where road infrastructures are weak, thereby further promoting the application of vehicle-road cooperation based on the C-V2X communication way.

Figure 5:
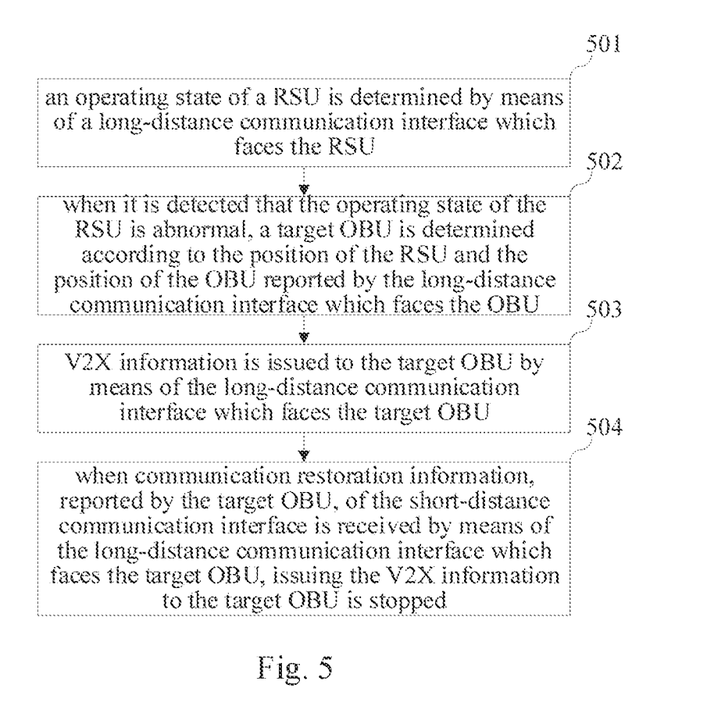
FIG. 5 is a schematic flow diagram of a communication method provided in a third embodiment of the present application.

A third embodiment of the present application relates to a communication method applied to a vehicle-to-everything platform, and a flow thereof is shown in FIG. 5. The communication method includes, but is not limited to the following operations:

At operation 501, an operating state of a RSU is determined by means of a long-distance communication interface which faces the RSU.

At operation 502, when it is detected that the operating state of the RSU is abnormal, a target OBU is determined according to the position of the RSU and the position of the OBU reported by the long-distance communication interface which faces the OBU.

At operation 503, V2X information is issued to the target OBU by means of the long-distance communication interface which faces the target OBU.

It is not difficult to discover that operations 501 to 503 in the present embodiment are approximately identical to operations 201 to 203 in the second embodiment so as not to be repeated herein.

At operation 504, when communication restoration information, reported by the target OBU, of the short-distance communication interface is received by means of the long-distance communication interface which faces the target OBU, issuing the V2X information to the target OBU is stopped.

It should be noted that, during actual applications, when the vehicle-to-everything platform receives the communication restoration information, reported by the target OBU, of the short-distance communication interface, i.e., the PC5 interface, it is possible that the target OBU receives again, by means of the PC5 interface, the heartbeat information and the V2X information issued by the RSU recognized to be in the abnormal operating state, that is, the operating state of the RSU recognized to be in the abnormal operating state returns to normal; or it is also possible that the target OBU receives, by means of the PC5 interface, the V2X information issued by other available RSUs when a vehicle runs to a road section where the available RSUs are disposed. However, in any case, the vehicle-to-everything platform may stop issuing the V2X information to the target OBU as long as the communication restoration information, reported by the target OBU, of the PC5 interface is received by means of the Uu interface, and then, the target OBU may mutually transmit the V2X information to the RSU by means of the PC5 interface.

According to the communication method provided in the embodiment of the present application, by adopting the double links, i.e., the PC5 bidirectional communication link between the OBU and the RSU and the Uu bidirectional communication link between the OBU and the vehicle-to-everything platform, when it is recognized by the vehicle-to-everything platform that the operating state of the RSU is in an abnormal state, the V2X information is directly issued to the OBU by means of the Uu interface, so that it is ensured that the OBU may also acquire the V2X information when the operating state of the RSU is in an abnormal state or on a road section where no RSUs are disposed, and then, the C-V2X service is provided for a vehicle.

Besides, after the vehicle-to-everything platform receives the communication restoration information, reported by the OBU, of the PC5 interface, the RSU issues the V2X information to the OBU by means of the PC5 interface, so that the V2X information may reach the OBU timely, and then, the real-time performance of the C-V2X service is ensured.

In addition, based on the above-mentioned double-link way, the communication method provided in the embodiment of the present application may also be perfectly suitable for places where road infrastructures are weak, thereby further promoting the application of vehicle-road cooperation based on the C-V2X communication way.

A fourth embodiment of the present application relates to a communication method applied to an OBU mounted in a vehicle, and including: an operating state of a RSU is determined by means of a short-distance communication interface which faces the RSU; when it is detected that the operating state of the RSU is in a normal state, V2X information is mutually transmitted to the RSU by means of the short-distance communication interface which faces the RSU, and vehicle information is reported to a vehicle-to-everything platform by means of a long-distance communication interface which faces the vehicle-to-everything platform, wherein the vehicle information includes a position of the vehicle, and enables the vehicle-to-everything platform to issue the V2X information to the OBU according to the position of the vehicle and the pre-recorded position of the RSU when the operating state of the RSU is in an abnormal state; and when it is detected that the operating state of the RSU is in an abnormal state, the V2X information is mutually transmitted to the vehicle-to-everything platform by means of the long-distance communication interface which faces the vehicle-to-everything platform.

Figure 6:
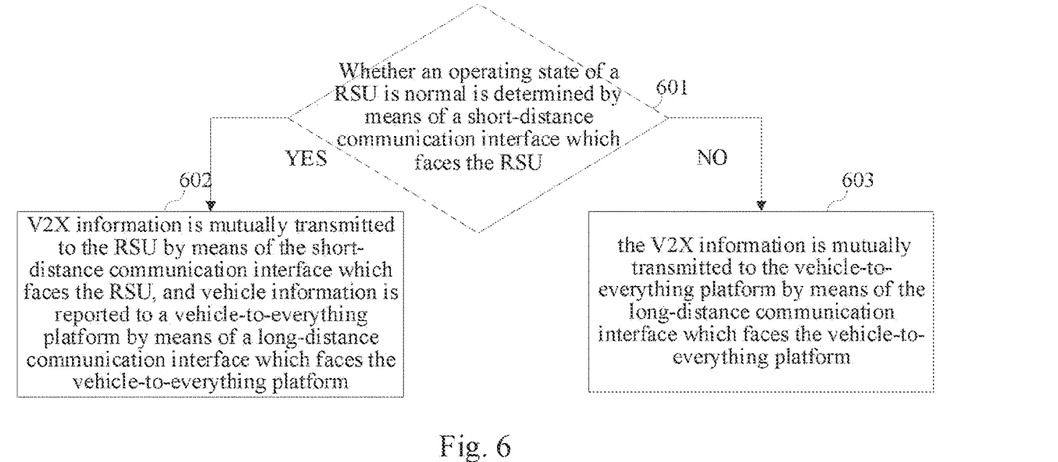
FIG. 6 is a schematic flow diagram of a communication method provided in a fourth embodiment of the present application.

During actual applications, a flow of the communication method is shown in FIG. 6. The communication method includes, but is not limited to the following operations:

At operation 601, an operating state of a RSU is determined by means of a short-distance communication interface which faces the RSU.

Specifically speaking, if the operating state of the RSU is in a normal state, the operation 602 will be performed; and if the operating state of the RSU is in an abnormal state, the operation 603 will be performed.

At operation 602, V2X information is mutually transmitted to the RSU by means of the short-distance communication interface which faces the RSU, and vehicle information is reported to a vehicle-to-everything platform by means of a long-distance communication interface which faces the vehicle-to-everything platform.

Specifically speaking, in the present embodiment, the vehicle information includes a position of the vehicle.

Accordingly, the OBU reports the vehicle information to the vehicle-to-everything platform by means of the long-distance communication interface which faces the vehicle-to-everything platform, which aims at enabling the vehicle-to-everything platform to issue the V2X information to the OBU according to the position of the vehicle and the pre-recorded position of the RSU when the operating state of the RSU is in an abnormal state.

At operation 603, when it is detected that the operating state of the RSU is in an abnormal state, the V2X information is mutually transmitted to the vehicle-to-everything platform by means of the long-distance communication interface which faces the vehicle-to-everything platform.

According to the communication method provided in the embodiment of the present application, when acquiring the V2X information, the OBU detects, based on the C-V2X communication way, the operating state of the RSU by means of the PC5 interface; then, when it is determined that the operating state of the RSU is in a normal state, the V2X information is directly and mutually transmitted to the RSU by means of the PC5 interface, and thus, the real-time performance of the C-V2X service is ensured; and when the operating state of the RSU is in an abnormal state, the V2X information is mutually transmitted to the vehicle-to-everything platform by means of the Uu interface, and thus, the target OBU may also acquire the V2X information even if the operating state of the RSU is in an abnormal state. Based on such a way, the robustness of C-V2X is effectively perfected, and then, the requirement for vehicle-road cooperation can be better satisfied.

Figure 7:
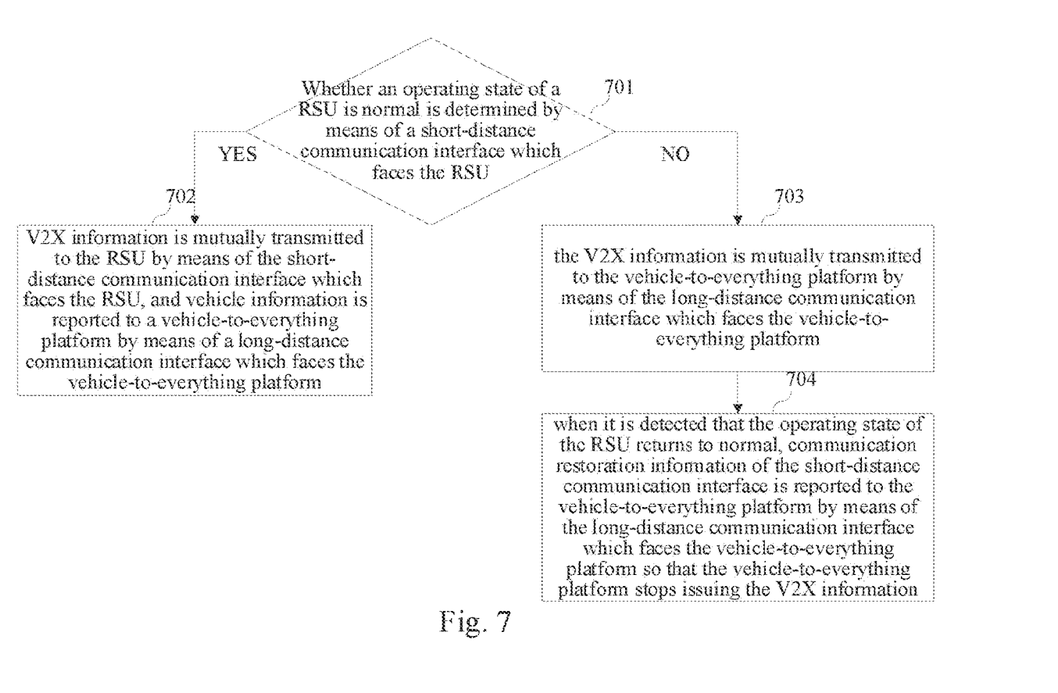
FIG. 7 is a schematic flow diagram of a communication method provided in a fifth embodiment of the present application.

A fifth embodiment of the present application relates to a communication method applied to an OBU mounted in a vehicle, and a flow thereof is shown in FIG. 7. The communication method includes, but is not limited to the following operations:

At operation 701, an operating state of a RSU is determined by means of a short-distance communication interface which faces the RSU.

Specifically speaking, if the operating state of the RSU is in a normal state, the operation 702 will be performed; and if the operating state of the RSU is in an abnormal state, the operation 703 will be performed.

In addition, it can be understood that, during actual applications, the communication method provided in the present embodiment may mutually cooperate with the communication method applied to the vehicle-to-everything platform, and therefore, the communication method provided in the present embodiment is still implemented based on the C-V2X communication way, that is, the subsequently appearing short-distance communication interface which faces the RSU in the present embodiment is still the above-mentioned PC5 interface in the communication method suitable for the vehicle-to-everything platform, and the long-distance communication interface which faces the vehicle-to-everything platform is still the Uu interface.

Accordingly, the way that the operating state of the RSU is determined in the present embodiment is still a way that the operating state of the RSU is determined based on the C-V2X communication way by means of the short-distance communication interface which faces the RSU, i.e., the PC5 interface.

Specifically, the operation of determining, based on the C-V2X communication way by means of the PC5 interface, whether the operating state of the RSU is in a normal state is similar to the way that the vehicle-to-everything platform determines the operating state of the RSU by means of the Uu interface, that is, it is a way that the heartbeat information transmitted by the RSU and the V2X information issued by the RSU are acquired. If both of the two kinds of information cannot be acquired, it is considered that the operating state of the RSU is in an abnormal state, or else, the operating state of the RSU is in a normal state.

In addition, there may be a situation that no RSUs are deployed on the current road section during actual applications, and therefore, before it is determined, by means of the PC5 interface, whether the operating state of the RSU is in a normal state, it needs to be firstly determined whether there are RSUs on the current road section, if so, the operation that the operating state of the RSU is determined based on the C-V2X communication way by means of the PC5 interface, and if not, the operation 703 will be directly performed.

At operation 702, V2X information is mutually transmitted to the RSU by means of the short-distance communication interface which faces the RSU, and vehicle information is reported to a vehicle-to-everything platform by means of a long-distance communication interface which faces the vehicle-to-everything platform.

Specifically speaking, during actual applications, when the operating state of the RSU is in a normal state, the OBU directly and mutually transmits the V2X information to the RSU by means of the PC5 interface, for example, the OBU transmits the BSM to the RSU, and the RSU transmits the V2X information such as SPAT, MAP, RSI, and RSM to the OBU. At the same time, in order to be convenient for the vehicle-to-everything platform to provide the V2X information for the current OBU when the operating state of the RSU is in an abnormal state, the OBU may also report the vehicle information to the vehicle-to-everything platform by means of the Uu interface.

It should be noted that, in the present embodiment, the vehicle information at least includes the position of the vehicle where the OBU is located, so that the vehicle-to-everything platform may issue the V2X information to the OBU according to the position of the RSU and the position of the vehicle when it is determined that the operating state of the RSU is in an abnormal state.

In addition, during actual applications, in order to ensure that the vehicle-to-everything platform may issue appropriate V2X information to the OBU, the vehicle information reported to the vehicle-to-everything platform by the OBU may further include information such as the current speed and size of a vehicle.

Based on this, when the operating state of the RSU is in a normal state, the OBU directly acquires the V2X information from the RSU by means of the PC5 interface, and thus, the real-time performance of the V2X information is ensured.

At operation 703, when it is detected that the operating state of the RSU is in an abnormal state, the V2X information is mutually transmitted to the vehicle-to-everything platform by means of the long-distance communication interface which faces the vehicle-to-everything platform.

Based on this, when the operating state of the RSU is in an abnormal state, the OBU may also normally acquire the V2X information, and thus, the quality of the C-V2X service is ensured.

At operation 704, when it is detected that the operating state of the RSU returns to normal, communication restoration information of the short-distance communication interface is reported to the vehicle-to-everything platform by means of the long-distance communication interface which faces the vehicle-to-everything platform so that the vehicle-to-everything platform stops issuing the V2X information.

Specifically speaking, although the vehicle-to-everything platform may provide the V2X information for the OBU, in order to ensure the real-time performance of the C-V2X service, if it is recognized by the OBU that the operating state of the RSU returns to normal, for example, the OBU receives heartbeat information transmitted by the RSU in an abnormal operating state again and receives the V2X information issued by the RSU, it is considered that the operating state of the RSU returns to normal, that is, both of the Uu bidirectional communication link between the RSU and the vehicle-to-everything platform and the PC5 bidirectional communication link between the RSU and the OBU return to normal. At this moment, the OBU may acquire V2X information with a stronger real-time performance from the RSU by means of the PC5 interface, and at the same time, in order to prevent the vehicle-to-everything platform from further issuing the V2X information to the OBU by means of the Uu interface, the OBU may actively report the communication restoration information of the PC5 interface to the vehicle-to-everything platform by means of the Uu interface, so that the vehicle-to-everything platform may stop issuing the V2X information to the OBU, the current OBU's occupation of vehicle-to-everything platform resources may be released, and then, the vehicle-to-everything platform may provide better service for other OBUs.

In the embodiment of the present application, by adopting the double links, i.e., the PC5 bidirectional communication link between the OBU and the RSU and the Uu bidirectional communication link between the OBU and the vehicle-to-everything platform, when it is recognized by the OBU that the operating state of the RSU is in an abnormal state, the V2X information is directly acquired from the vehicle-to-everything platform by means of the Uu interface, so that it is ensured that the OBU may also acquire the V2X information when the operating state of the RSU is in an abnormal state or on a road section where no RSUs are disposed, and then, the C-V2X service is provided for a vehicle.

Besides, when it is recognized by the OBU that the operating state of the RSU is in a normal state or the operating state of the RSU returns to normal, acquiring the V2X information from the vehicle-to-everything platform by means of the Uu interface is stopped, but the V2X information is acquired from the RSU by means of the PC5 interface, so that the V2X information may reach the OBU timely, and then, the real-time performance of the C-V2X service is ensured.

In addition, based on the above-mentioned double-link way, the communication method provided in the embodiment of the present application may also be perfectly suitable for places where road infrastructures are weak, thereby further promoting the application of vehicle-road cooperation based on the C-V2X communication way.

Figure 8:
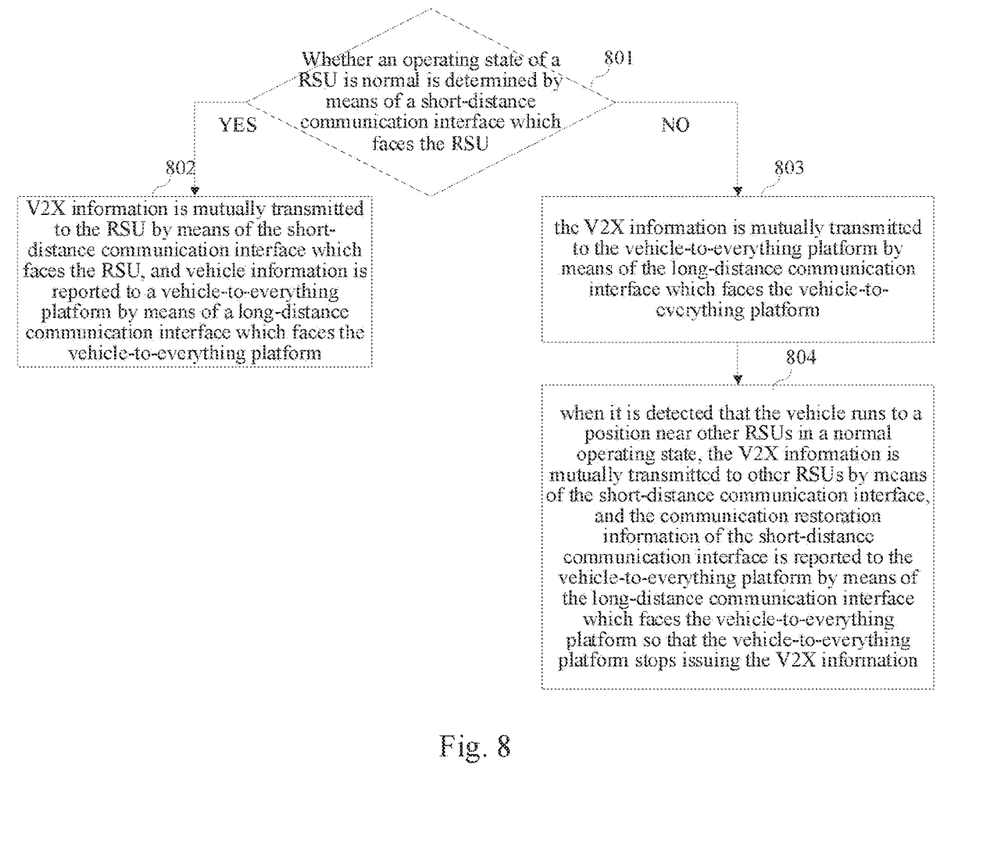
FIG. 8 is a schematic flow diagram of a communication method provided in a sixth embodiment of the present application.

A sixth embodiment of the present application relates to a communication method applied to an OBU mounted in a vehicle, and a flow thereof is shown in FIG. 8. The communication method includes, but is not limited to the following operations:

At operation 801, an operating state of a RSU is determined by means of a short-distance communication interface which faces the RSU.

Specifically speaking, if the operating state of the RSU is in a normal state, the operation 802 will be performed; and if the operating state of the RSU is in an abnormal state, the operation 803 will be performed.

At operation 802, V2X information is mutually transmitted to the RSU by means of the short-distance communication interface which faces the RSU, and vehicle information is reported to a vehicle-to-everything platform by means of a long-distance communication interface which faces the vehicle-to-everything platform.

At operation 803, when it is detected that the operating state of the RSU is in an abnormal state, the V2X information is mutually transmitted to the vehicle-to-everything platform by means of the long-distance communication interface which faces the vehicle-to-everything platform.

It is not difficult to discover that operations 801 to 803 in the present embodiment are approximately identical to operations 701 to 703 in the fifth embodiment so as not to be repeated herein.

At operation 804, when it is detected that the vehicle runs to a position near other RSUs in a normal operating state, the V2X information is mutually transmitted to other RSUs by means of the short-distance communication interface, and the communication restoration information of the short-distance communication interface is reported to the vehicle-to-everything platform by means of the long-distance communication interface which faces the vehicle-to-everything platform so that the vehicle-to-everything platform stops issuing the V2X information.

According to the communication method provided in the embodiment of the present application, by adopting the double links, i.e., the PC5 bidirectional communication link between the OBU and the RSU and the Uu bidirectional communication link between the OBU and the vehicle-to-everything platform, when it is recognized by the OBU that the operating state of the RSU is in an abnormal state, the V2X information is directly acquired from the vehicle-to-everything platform by means of the Uu interface, so that it is ensured that the OBU may also acquire the V2X information when the operating state of the RSU is in an abnormal state or on a road section where no RSUs are disposed, and then, the C-V2X service is provided for a vehicle.

Besides, after the OBU runs to a position near other RSUs in a normal operating state, the way that the V2X information is acquired from the vehicle-to-everything platform by means of the Uu interface is changed into a way that the V2X information is acquired from the other nearby RSUs in the normal operating state by means of the PC5 interface, so that the V2X information may reach the OBU timely, and then, the real-time performance of the C-V2X service is ensured.

In addition, based on the above-mentioned double-link way, the communication method provided in the embodiment of the present application may also be perfectly suitable for places where road infrastructures are weak, thereby further promoting the application of vehicle-road cooperation based on the C-V2X communication way.

It is not difficult to discover that, during actual applications, the communication method applied to the OBU mounted in the vehicle mutually cooperates with the communication method applied to the vehicle-to-everything platform, and therefore, the fourth, fifth and sixth embodiments can mutually cooperate with the first, second and third embodiments so as to be implemented. Relevant technical details mentioned in the first, second and third embodiments are still valid so as not to be repeated herein for reducing repetition. Accordingly, the relevant technical details mentioned in the fourth, fifth and sixth embodiments can also be applied in the first, second and third embodiments.

In addition, it should be understood that step division of the various methods mentioned as above is only for the purpose of clear description, during implementation, the steps may be combined into one step or some steps may be split to form a plurality of steps, and the steps fall within the protection scope of the present patent as long as they include the same logic relationship. Inessential modifications added in an algorithm or flow or inessential designs introduced to the algorithm or flow without changing core designs of the algorithm and the flow fall within the protection scope of this patent.

Figure 9:
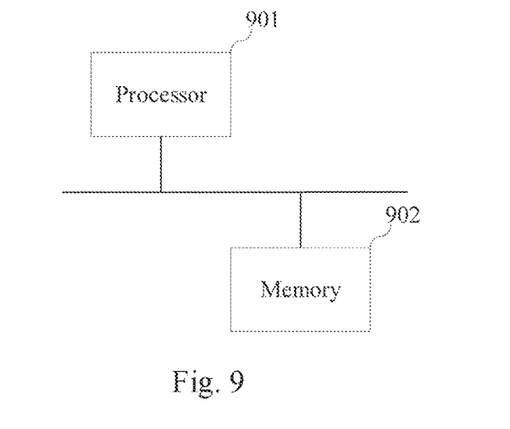
FIG. 9 is a schematic structural diagram of a vehicle-to-everything platform provided in a seventh embodiment of the present application/an on-board unit provided in an eighth embodiment of the present application.

A seventh embodiment of the present application relates to a vehicle-to-everything platform, as shown in FIG. 9, including at least one processor 901; and a memory 902 in communication connection with the at least one processor 901; wherein the memory 902 stores an instruction executable for the at least one processor 901, and the instruction is executed by the at least one processor 901 so that the at least one processor 901 is capable of performing the communication method applied to the vehicle-to-everything platform in the above-mentioned method embodiment.

The memory 902 is connected with the processor 901 by a bus which may include any number of buses and bridges interconnected with each other and is configured to connect various circuits of one or more processors 901 and the memory 902 together. The bus is also capable of connecting various other circuits such as a peripheral device, a voltage stabilizer and a power management circuit together, which is known by the skilled in the art. Therefore, the further description of the bus is omitted herein. A bus interface provides an interface between the bus and a transceiver. The transceiver may be one or more elements, such as a plurality of receivers and transmitters and provides a unit used for communication with various other apparatuses on a transmission medium. Data processed by the processor 901 is transmitted on a wireless medium by an antenna, and further, the antenna further receives the data and transmits the data to the processor 901.

The processor 901 is responsible for managing the bus and general processing, and may also provide various functions, including timing, peripheral interfaces, voltage regulation, power management, and other control functions. The memory 902 may be used to store the data used when the processor 901 performs an operation.

An eighth embodiment of the present application relates to an on-board unit.

Specifically speaking, in an embodiment, a schematic diagram of an internal structure of a vehicle-to-everything platform may be shown in FIG. 9, operating principles and connecting ways of all components thereof are similar to those of the vehicle-to-everything platform in the seventh embodiment except that a memory in the on-board unit stores an instruction for implementing the above-mentioned communication method for the on-board unit, and a processor is configured to implement the above-mentioned communication method for the on-board unit based on the instruction stored in the memory.

A ninth embodiment of the present application relates to a computer-readable storage medium, having stored thereon, a computer program which, when executed by a processor, implements the communication method applied to the vehicle-to-everything platform or the communication method applied to the OBU mounted in the vehicle in the above-mentioned method embodiments.

That is, it can be understood by the skilled in the art that all or parts of steps of the methods in the above-mentioned embodiments can be completed by a program instructing relevant hardware. The program is stored in a storage medium and includes a plurality of instructions for enabling one device (which may be a single chip microcomputer, a chip and the like) or a processor to perform all or parts of the steps of the method in each of the embodiments of the present application. The above-mentioned storage medium includes various media, such as a U disk, a mobile hard disk, an ROM (Read-Only Memory), an RAM (Random Access Memory), a diskette or an optical disk, capable of storing program codes.

It can be understood by those of ordinary skill in the art that above-mentioned embodiments are specific embodiments for implementing the present application. During actual applications, various changes can be made in terms of form and detail thereof without departing from the spirit and scope of the present application.

What is claimed is:

1. A communication method, applied to a vehicle-to-everything (V2X) platform, the communication method comprising:
   determining an operating state of a road side unit (RSU) by means of a long-distance communication interface which faces the RSU;
   upon the condition that it is detected that the operating state of the RSU is abnormal, determining a target on-board unit (OBU) according to a position of the RSU and a position of the OBU reported by the long-distance communication interface which faces the OBU, the OBU establishing a communication connection with the RSU by means of a short-distance communication interface; and
   issuing a V2X information to the target OBU by means of the long-distance communication interface which faces the target OBU.

2. The communication method of claim 1, wherein, after the issuing a V2X information to the target OBU by means of the long-distance communication interface which faces the target OBU, the method further comprises:
   receiving, by means of the long-distance communication interface which faces the target OBU, a basic safety message reported by the target OBU;
   adjusting information relevant to the basic safety message in the V2X information according to the basic safety message; and
   issuing adjusted the V2X information to the target OBU by means of the long-distance communication interface which faces the target OBU.

3. The communication method of claim 1, wherein, the method further comprises:
   upon the condition that it is detected that the operating state of the RSU returns to normal, stopping issuing the V2X information to the target OBU.

4. The communication method of claim 1, wherein, the method further comprises:
   upon the condition that a communication restoration information, reported by the target OBU, of the short-distance communication interface is received by means of the long-distance communication interface which faces the target OBU, stopping issuing the V2X information to the target OBU.

5. The communication method of claim 1, wherein, the determining an operating state of a RSU by means of a long-distance communication interface which faces the RSU comprises:
   acquiring, by means of the long-distance communication interface which faces the RSU, a basic safety message reported by the RSU and a heartbeat information transmitted by the RSU, the basic safety message being provided by the OBU establishing a communication connection with the RSU by means of the short-distance communication interface; and
   upon the condition that the basic safety message and/or the heartbeat information is not acquired, determining that the operating state of the RSU is abnormal.

6. A communication method, applied to an OBU mounted in a vehicle, the communication method comprising:
   determining an operating state of a RSU by means of a short-distance communication interface which faces the RSU;
   upon the condition that it is detected that the operating state of the RSU is normal, mutually transmitting a V2X information to the RSU by means of the short-distance communication interface which faces the RSU, and reporting vehicle information to a V2X platform by means of a long-distance communication interface which faces the V2X platform, the vehicle information comprising a position of the vehicle, so that the V2X platform issues the V2X information to the OBU according to the position of the vehicle and a pre-recorded position of the RSU upon the condition that the operating state of the RSU is abnormal; and
   upon the condition that it is detected that the operating state of the RSU is abnormal, mutually transmitting the V2X information to the V2X platform by means of the long-distance communication interface which faces the V2X platform.

7. The communication method of claim 6, wherein, the method further comprises:
   upon the condition that it is detected that the operating state of the RSU returns to normal, reporting a communication restoration information of the short-distance communication interface to the V2X platform by means of the long-distance communication interface which faces the V2X platform so that the V2X platform stops issuing the V2X information.

8. The communication method of claim 6, wherein, the method further comprises:

upon the condition that it is detected that the vehicle runs to a position near another RSU in a normal operating state, mutually transmitting the V2X information to the other RSU by means of the short-distance communication interface, and reporting the communication restoration information of the short-distance communication interface to the V2X platform by means of the long-distance communication interface which faces the V2X platform so that the V2X platform stops issuing the V2X information.

9. The communication method of claim 6, wherein, the method further comprises:
determining whether the RSU exists;
upon the condition that it is determined that the RSU exists, performing the step of determining the operating state of the RSU by means of the short-distance communication interface which faces the RSU; and
upon the condition that it is determined that the RSU does not exist, performing the step of mutually transmitting the V2X information to the V2X platform by means of the long-distance communication interface which faces the V2X platform.

10. A V2X platform, comprising:
at least one processor; and
a memory in communication connection with the at least one processor; wherein, the memory stores an instruction executable by the at least one processor, and the instruction is executed by the at least one processor so that the at least one processor is capable of performing the communication method of claim 1.

11. An OBU, comprising:
at least one processor; and
a memory in communication connection with the at least one processor; wherein the memory stores an instruction executable by the at least one processor, and the instruction is executed by the at least one processor so that the at least one processor is capable of performing the communication method of claim 6.

12. A non-transitory computer-readable storage medium, storing a computer program when executed by a processor, the computer program implements the communication method of claim 1.

13. The communication method of claim 2, wherein, the method further comprises:
upon the condition that it is detected that the operating state of the RSU returns to normal, stopping issuing the V2X information to the target OBU.

14. The communication method of claim 2, wherein, the method further comprises:
upon the condition that a communication restoration information, reported by the target OBU, of the short-distance communication interface is received by means of the long-distance communication interface which faces the target OBU, stopping issuing the V2X information to the target OBU.

15. The communication method of claim 3, wherein, the method further comprises:
upon the condition that a communication restoration information, reported by the target OBU, of the short-distance communication interface is received by means of the long-distance communication interface which faces the target OBU, stopping issuing the V2X information to the target OBU.

16. The communication method of claim 13, wherein, the method further comprises:
upon the condition that a communication restoration information, reported by the target OBU, of the short-distance communication interface is received by means of the long-distance communication interface which faces the target OBU, stopping issuing the V2X information to the target OBU.

17. The communication method of claim 2, wherein, the determining an operating state of a RSU by means of a long-distance communication interface which faces the RSU comprises:
acquiring, by means of the long-distance communication interface which faces the RSU, a basic safety message reported by the RSU and a heartbeat information transmitted by the RSU, the basic safety message being provided by the OBU establishing a communication connection with the RSU by means of the short-distance communication interface; and
upon the condition that the basic safety message and/or the heartbeat information is not acquired, determining that the operating state of the RSU is abnormal.

18. The communication method of claim 3, wherein, the determining an operating state of a RSU by means of a long-distance communication interface which faces the RSU comprises:
acquiring, by means of the long-distance communication interface which faces the RSU, a basic safety message reported by the RSU and a heartbeat information transmitted by the RSU, the basic safety message being provided by the OBU establishing a communication connection with the RSU by means of the short-distance communication interface; and
upon the condition that the basic safety message and/or the heartbeat information is not acquired, determining that the operating state of the RSU is abnormal.

19. The communication method of claim 4, wherein, the determining an operating state of a RSU by means of a long-distance communication interface which faces the RSU comprises:
acquiring, by means of the long-distance communication interface which faces the RSU, a basic safety message reported by the RSU and a heartbeat information transmitted by the RSU, the basic safety message being provided by the OBU establishing a communication connection with the RSU by means of the short-distance communication interface; and
upon the condition that the basic safety message and/or the heartbeat information is not acquired, determining that the operating state of the RSU is abnormal.

20. A non-transitory computer-readable storage medium, storing a computer program when executed by a processor, the computer program implements the communication method of claim 6.

* * * * *